US012748230B2

(12) United States Patent
Cao et al.

(10) Patent No.: US 12,748,230 B2
(45) Date of Patent: Sep. 29, 2026

(54) IMAGING METHODS FOR DISPERSION ENERGY SPECTRUMS OF SURFACE WAVES, ELECTRONIC DEVICES, AND STORAGE MEDIA

(71) Applicant: SOUTHWEST PETROLEUM UNIVERSITY, Chengdu (CN)

(72) Inventors: Weiping Cao, Chengdu (CN); Luo Li, Chengdu (CN); Xuri Huang, Chengdu (CN); Hai Yao, Chengdu (CN); Yungui Xu, Chengdu (CN); Yezheng Hu, Chengdu (CN); Jing Tang, Chengdu (CN); Ran Yang, Chengdu (CN); Mengcheng Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 583 days.

(21) Appl. No.: 18/342,619

(22) Filed: Jun. 27, 2023

(65) Prior Publication Data

US 2024/0094420 A1 Mar. 21, 2024

(30) Foreign Application Priority Data

Sep. 13, 2022 (CN) .......................... 202211111565.8

(51) Int. Cl.
*G01V 1/34* (2006.01)
*G01V 1/30* (2006.01)
*G06T 5/10* (2006.01)

(52) U.S. Cl.
CPC .............. *G01V 1/345* (2013.01); *G01V 1/303* (2013.01); *G06T 5/10* (2013.01); *G06T 2207/20056* (2013.01)

(58) Field of Classification Search
CPC .......... G01V 1/345; G01V 1/303; G01V 1/30; G01V 1/32; G01V 2210/43; G01V 2210/46; G01V 2210/6222; G06T 5/10; G06T 2207/20056
See application file for complete search history.

(56) References Cited

U.S. PATENT DOCUMENTS

2015/0036460 A1* 2/2015 Kinoshita .............. G01V 1/345
367/7
2018/0364383 A1* 12/2018 Ma ........................... G01V 1/28

FOREIGN PATENT DOCUMENTS

CN 112285767 A * 1/2021 ............... G01V 1/18

OTHER PUBLICATIONS

Machine translation of CN112285767A (Year: 2021).*

* cited by examiner

*Primary Examiner* — Lee E Rodak
*Assistant Examiner* — Sangkyung Lee
(74) *Attorney, Agent, or Firm* — METIS IP LLC

(57) ABSTRACT

The embodiment of the present disclosure provides an imaging method for a dispersion energy spectrum of surface waves, an electronic device, and a storage medium. The imaging method includes: obtaining first surface wave data, and the first surface wave data corresponding to a space-time domain representation; processing the first surface wave data to obtain the second surface wave data, and the second surface wave data corresponding to a space-frequency domain representation; and processing the second surface wave data based on a preset algorithm to obtain a first imaging result, the first imaging result corresponding to a slowness-frequency domain representation.

17 Claims, 6 Drawing Sheets

IMAGING METHODS FOR DISPERSION ENERGY SPECTRUMS OF SURFACE WAVES, ELECTRONIC DEVICES, AND STORAGE MEDIA

CROSS-REFERENCE TO RELATED APPLICATION

This application claims priority of the Chinese Patent Application No. 202211111565.8, filed on Sep. 13, 2022, the entire contents of which are hereby incorporated by reference.

TECHNICAL FIELD

The present disclosure relates to the field of surface wave exploration, and in particular, to an imaging method for a dispersion energy spectrum of surface waves, an electronic device, and a storage medium.

BACKGROUND

Surface wave exploration technology, which has developed rapidly in recent years, is a tool for exploring near surfaces. The technology has advantages of high detection accuracy, large exploration depth, low economic cost, etc. With these advantages, surface wave exploration technology is extensively used in a variety of areas such as geotechnical exploration, geological non-destructive inspection, and real-time monitoring of the urban underground environment.

Surface wave energy plays a dominant part in seismic wave field energy, and the surface wave carries abundant information about the shear wave velocity of the underground medium. In the late 1990s, a multi-channel surface wave analysis for near-surface exploration was proposed, which has been widely used in surface wave exploration due to advantages of strong noise resistance, efficient implementation, etc. There are four main processes included in the analysis: collection of field surface wave data, computation of the dispersion energy spectrum of surface wave(s), dispersion curve picking, and an inversion of a shear wave velocity structure. Accurate imaging of a dispersion energy spectrum of surface wave(s) is a crucial step in an inversion of a shear wave velocity structure using the dispersion curves of surface waves. However, traditional imaging methods currently produce low resolution results.

Therefore, an imaging method for a dispersion energy spectrum of surface waves, an electronic device, and a storage medium are provided, which are helpful for achieving high-resolution imaging of a dispersion energy spectrum of surface wave(s).

SUMMARY

One of the embodiments of the present disclosure provides an imaging method for a dispersion energy spectrum of surface waves, and the imaging method includes: obtaining first surface wave data, and the first surface wave data corresponding to a space-time domain representation; processing the first surface wave data to obtain second surface wave data, and the second surface wave data corresponding to a space-frequency domain representation; processing the second surface wave data based on a preset algorithm to obtain a first imaging result, and the first imaging result corresponding to a slowness-frequency domain representation.

One of the embodiments of the present disclosure provides an electronic device, the electronic device includes a memory, a processor, and a computer program stored in the memory and operating on the processor, and the imaging method for dispersion energy spectrum of surface waves is implemented when the processor executes the computer program.

One of the embodiments of the present disclosure provides a non-transitory computer-readable storage medium. The non-transitory computer-readable storage medium stores the computer program, and the imaging method for dispersion energy spectrum of surface waves is implemented when the processor executes the computer program.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same numeral denotes the same structure, wherein.

DETAILED DESCRIPTION

Figure 1:
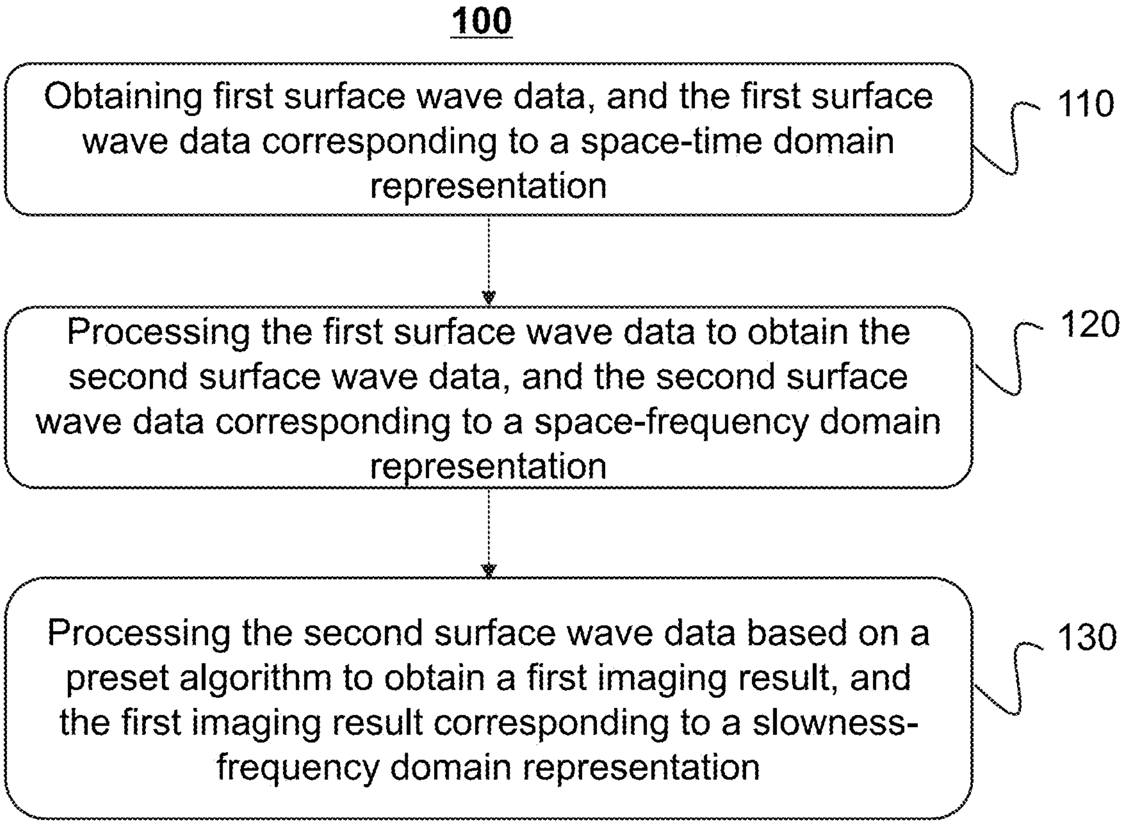
FIG. 1 is an exemplary flowchart illustrating an imaging method for a dispersion energy spectrum of surface waves according to some embodiments of the present disclosure.

In order to more clearly explain the technical scheme of the embodiment of the present disclosure, a brief description of the accompanying drawings required for the embodiment description is given below. Obviously, the accompanying drawings below are only some examples or embodiments of the present disclosure, and those skilled in the art may apply the present disclosure to other similar scenarios according to these accompanying drawings without creative effort. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, if other words may achieve the same purpose, the words may be replaced by other expressions.

As shown in the present disclosure and claims, the words "one", "a", "an" and/or "the" are not especially singular but may include the plural unless the context expressly suggests otherwise. Generally speaking, the terms "comprise", "comprises", "comprising", "include", "includes", and/or "including" only suggest the inclusion of clearly identified steps and elements, but these steps and elements do not constitute an exclusive list, and the method or device may also contain other steps or elements.

The flowcharts used in the present disclosure illustrate operations that systems implement according to some embodiments of the present disclosure. It should be understood that the preceding or following operations are not necessarily performed in the exact order. Instead, various steps may be processed in reverse order or simultaneously. At the same time, other operations may be added to these procedures, or a certain step or steps may be removed from these procedures.

Surface waves carry abundant information about subsurface rock layers in their propagation, which shows dispersion features and also indirectly reflect one or more inherent properties of a layered medium. High-resolution imaging of a dispersion energy spectrum of surface waves plays a vital role in inverting a shear wave velocity structure. However, a dispersion energy spectrum obtained by traditional methods has a relatively low resolution.

In view of this, the present disclosure provides an imaging method for a dispersion energy spectrum of surface waves, which achieves a high imaging resolution of the dispersion energy spectrum of surface waves.

FIG. 1 is an exemplary flowchart illustrating an imaging method for a dispersion energy spectrum of surface waves according to some embodiments of the present disclosure. In some embodiments, process 100 may be executed by a processor. As shown in FIG. 1, the process 100 includes the following steps.

Step 110, obtaining first surface wave data, and the first surface wave data corresponding to a space-time domain representation.

The first surface wave data refers to at least one original surface wave record collected using a surface wave exploration manner.

In some embodiments, the first surface wave data corresponds to the space-time domain representation. For example, the first surface wave data may be surface wave data in a d(x, t) domain, where t denotes a time and x denotes an offset. The offset refers to a horizontal distance between a seismic excitation point and a wave detector.

The first surface wave data may be collected in the field by a relevant exploration device. Exemplarily, the relevant exploration device may include a surface wave detector, etc.

The processor may obtain the first surface wave data in a plurality of ways. In some embodiments, the processor may obtain the first surface wave data by communicating with the relevant exploration device. In some embodiments, the processor may obtain the first surface wave data by receiving an input of a user.

In some embodiments, before performing transformation processing on the first surface wave data to determine second surface wave data, the processor may perform preprocessing on the first surface wave data.

In some embodiments, the preprocessing may include selection processing and filtering processing.

The selection processing refers to selecting suitable surface wave data for subsequent analysis. For example, surface wave data with a suitable offset (i.e., surface wave(s) developed well) may be selected. Through the selection processing, surface wave data that is not yet fully developed but has strong signal energy and interference, which seriously affect subsequent dispersion imaging results may be screened out, so that the dispersion imaging performance can be effectively improved.

The filtering processing refers to filtering out noise. Interference waves other than the surface waves may exist in the first surface wave data. By filtering the first surface wave data, the interference waves may be suppressed, and the constructive waves (such as the surface waves) may be enhanced. Exemplarily, surface wave processing includes performing the filtering processing on the first surface wave data through a band-pass filter, which removes interference waves with a higher frequency and weaker energy (relative to the surface waves).

In some embodiments of the present disclosure, performing the preprocessing on the obtained first surface wave data is beneficial to improve data quality and make subsequent data processing and analysis easier and more effective.

Step 120, processing the first surface wave data to obtain the second surface wave data, and the second surface wave data corresponding to a space-frequency domain representation.

The second surface wave data refers to surface wave data obtained after transforming the first surface wave data. In some embodiments, the second surface wave data corresponds to the space-frequency domain representation. For example, the second surface wave data may be surface wave data in a d(x, f) domain, where f denotes a frequency.

In some embodiments, the processor may obtain the second surface wave data by performing a time-frequency transform on the first surface wave data. In some embodiments, manners for performing the time-frequency transform include but are not limited to, a Fourier transform, a Laplace transform, etc.

In some embodiments, the processor may perform the Fourier transform on the first surface wave data to obtain the second surface wave data. In some embodiments, the processor may perform a one-dimensional Fourier transform on the first surface wave data to obtain the second surface wave data. For example, the processor may perform the one-dimensional Fourier transform along a time direction of the first surface wave data to obtain data in the space-frequency domain representation, i.e., the second surface wave data.

In some embodiments, the processor may perform the one-dimensional Fourier transform on each surface wave record in the first surface wave data to obtain the second surface wave data.

In some embodiments of the present disclosure, the second surface wave data is obtained by performing the Fourier transform on the first surface wave data, which transforms surface wave data from the space-time domain representation which is difficult for analyzing into the space-frequency domain representation which is easy for analyzing.

Step 130, processing the second surface wave data based on a preset algorithm to obtain a first imaging result, and the first imaging result corresponding to a slowness-frequency domain representation.

The first imaging result refers to an image of the second surface wave data in the slowness-frequency domain. The first imaging result has a high resolution.

In some embodiments, the preset algorithm may transform the surface wave data from the space-frequency domain into the slowness-frequency domain.

In some embodiments, the preset algorithm includes a high-resolution Radon transform based on an iterative shrinkage threshold algorithm (ISTA). In some embodiments, the preset algorithm may also include a high-resolution Radon transform based on a fast iterative shrinkage threshold algorithm.

In some embodiments, the processor processes the second surface wave data based on the preset algorithm and obtains an optimal solution (i.e., a high-resolution solution) using the high-resolution Radon transform based on the iterative shrinkage threshold algorithm.

In some embodiments of the present disclosure, the second surface wave data is processed based on the preset algorithm, which is beneficial to achieve high-resolution imaging of a dispersion energy spectrum of surface waves effectively, improve accuracy of picking dispersion curves, and ensure a subsequent accurate inversion of shear wave velocity. The algorithm is applicable to surface wave data with a low signal-to-noise ratio. Particularly, the algorithm provides reliable processing tools for an increasing amount of urban surface wave data with a low signal-to-noise ratio, which offers high calculation efficiency and precision and achieves high-resolution imaging.

In some embodiments, the processor may also process the first imaging result based on a preset transformation algorithm to obtain a second imaging result.

In some embodiments, the second imaging result includes a dispersion energy spectrum. In some embodiments, the second imaging result includes a high-resolution dispersion energy spectrum.

The preset transformation algorithm refers to an algorithm for transforming the first imaging result from the slowness-frequency domain into the frequency-velocity domain.

In some embodiments, the preset transformation algorithm includes: transforming the first imaging result based on a correlation between slowness and velocity to obtain the second imaging result.

In some embodiments, the correlation between slowness and time includes: the slowness is a reciprocal of the velocity. In some embodiments, the processor may transform the first imaging result from the slowness-frequency domain into a frequency-velocity domain to obtain the second imaging result based on the relationship between slowness and velocity.

In some embodiments of the present disclosure, by processing the first imaging result based on the preset transformation algorithm, a second imaging result with a high resolution can be quickly constructed.

In some embodiments, the preset algorithm is performed at least based on the iterative shrinkage threshold algorithm, including: constructing an objective function based on a first algorithm; solving the objective function using a second algorithm, wherein a solution of the objective function is high-resolution third surface wave data, and the second algorithm is a steepest descent algorithm.

In some embodiments, processing the second surface wave data based on the preset algorithm to obtain the first imaging result includes: constructing the objective function based on the second surface wave data; and solving the objective function using a preset solving algorithm, and a solution of the objective function is the first imaging result.

The objective function refers to a function that needs to be optimized and solved. In some embodiments, the objective function may be determined based on prior knowledge. In some embodiments, the processor may construct the objective function based on the second surface wave data. In some embodiments, the processor may construct the objective function based on a Radon model. The Radon model refers to a data representation of the second surface wave data in a Radon domain.

In some embodiments, the objective function includes a data error term and a regularization term. The processor may construct the objective function based on the data error term and the regularization term.

In some embodiments, the processor may designate an L1 norm as the regularization term and designate an L2 norm as the data error term and construct the objective function based on the second surface wave data and the Radon model.

In some embodiments, the processor may implement the first algorithm by a formula (1):

$$\Phi=\|d-L\times m\|^2+\beta\|m\|^1, \tag{1}$$

wherein Φ denotes the objective function, d denotes the second surface wave data, L denotes a positive transformation operator, β denotes a regularization parameter, m denotes the Radon model, 2 denotes the data error term, and 1 denotes the regularization term.

In some embodiments of the present disclosure, a difference between the first surface wave data and the Radon model is measured by the data error term, and the regularization term is used to improve sparsity of the Radon model, so that an updated Radom model can be determined accurately.

The second algorithm is used to solve the objective function. In some embodiments, the second algorithm may be a steepest descent algorithm.

A preset solving algorithm may be in various forms. In some embodiments, the preset solving algorithm may be the steepest descent algorithm. In some embodiments, the preset solving algorithm may also be a gradient descent algorithm.

In some embodiments, solving the objective function using the preset solving algorithm includes: determining a gradient direction of the objective function; determining an iteration step size in the gradient direction; updating the Radon model through at least one round of iteration based on the gradient direction and the iteration step size, stopping the at least one round of iteration until an iteration end condition is met, and obtaining an optimal solution of the objective function.

The gradient direction refers to a direction of a certain point in which the objective function changes fastest. The processor may determine the gradient direction in a plurality of ways.

In some embodiments, the processor may determine the gradient direction of the objective function by a formula (2):

$$g_i = L^T \times r_{i-1}, \tag{2}$$

wherein $g_i$ denotes a gradient direction of an i-th round of iteration, $L=e^{i2\pi fpx}$, f denotes a frequency, p denotes slowness, x denotes an offset, $r_0=d$, d denotes the second surface wave data, i denotes a current count of rounds of iteration, and $r_{i-1}$ denotes a data residual term of an (i−1)-th round of iteration.

The data residual term refers to a difference between an actual observed value and an estimated value (i.e., a fitted value). The data residual term of each round of iteration may be different. The processor may determine the data residual term in a plurality of ways. In some embodiments, the processor may determine the data residual term by a formula (3):

$$r_i = d - L \times m_i, \tag{3}$$

wherein $r_i$ denotes a data residual term of the i-th round of iteration, and $m_i$ denotes a Radom model of the i-th round of iteration.

In some embodiments of the present disclosure, the gradient direction of the objective function is determined through the above formulas, which can accurately reflect a changing trend of the objective function at a current point, thereby helping the algorithm to iterate better to an optimal solution.

The processor may determine the iteration step size in a plurality of ways. In some embodiments, the processor may determine the iteration step size based on a changing trend of the objective function. In some embodiments, the processor may determine the iteration step size based on historical data.

In some embodiments, the processor may determine the iteration step size by a formula (4):

$$k_i = \frac{g_i \times g_i}{(L \times g_i) \times (L \times g_i)}, \tag{4}$$

wherein $k_i$ denotes an iteration step size of the i-th round of iteration. Descriptions regarding $g_i$ and L may be found in related descriptions hereinabove.

In some embodiments of the present disclosure, the iteration step size is calculated by using the above formula, which ensures that each round of iteration can be updated close to the optimal solution and avoid a problem of the iteration step size being too large or too small at the same time, thereby improving stability and a convergence speed of the algorithm.

In some embodiments, the at least one round of iteration is performed at least based on the iterative shrinkage threshold algorithm, correspondingly, the processor may perform the at least one round of iteration on the Radom model based on the iterative shrinkage threshold algorithm.

In some embodiments, the processor performs the at least one round of iteration on the Radom model, which may be performed by a formula (5):

$$m_i = T_{0_i} \times m_{i-1} + k_i \times g_i, \tag{5}$$

wherein $m_i$ denotes the Radom model of the i-th round of iteration, $m_{i-1}$ denotes a Radom model of the (i−1)-th round of iteration, and $T_{0_i}$ denotes a shrinkage operator of the i-th round of iteration. Descriptions regarding $k_i$ and $k_i$ may be found in related descriptions hereinabove.

In some embodiments, the shrinkage operator $T_{0_i}$ may be determined by a formula (6):

$$T_{0_i} = \left(\max|m_i| - a\frac{I-i}{I}\max|m_i|\right), \tag{6}$$

wherein a denotes a preset threshold, I denotes a maximum rounds of iteration, i denotes a current round of iteration, and $m_0=0$.

The preset threshold may be a system default value, an experience value, a human preset value, or any combination thereof, which may be set according to actual needs and does not limited by the present disclosure.

In some embodiments of the present disclosure, an iteration of the Radon model based on the shrinkage operator may be used to limit a variation range of the preset threshold during the iteration to avoid overfitting. Specifically, the shrinkage operator gradually shrinks the variation range by subtracting a value smaller than a current value, thereby making the iteration more stable and convergent.

In some embodiments, the iteration end condition may be that a data loss term converges, the count of rounds of iteration reaches a threshold, etc. When the iteration end condition is met, the processor may stop updating the preset threshold and obtain an optimal solution (i.e., a high-resolution solution) of the preset threshold.

In some embodiments of the present disclosure, by using the steepest descent algorithm to iterate the first surface wave data cyclically, the optimal solution of the objective function may be obtained within a limited time, thereby improving a resolution and accuracy of imaging of a dispersion energy spectrum of surface waves. By performing at least one round of iteration on the preset threshold based on the gradient direction and the iteration step size and stopping the iteration until the iteration end condition is met, calculation efficiency and accuracy can be effectively improved.

In some embodiments of the present disclosure, the high-resolution solution is obtained based on the preset iterative algorithm and the first surface wave data, which can facilitate identification and analysis of effective signals and noises.

In some embodiments, the processor may solve the objective function using the steepest descent algorithm with a preferred parameter.

The preferred parameter refers to a relevant parameter selected to make an obtained objective function closer to a real solution. In some embodiments, the preferred parameter includes at least one of a preferred iteration step size and a preferred count of rounds of iteration.

The preferred parameter may be determined in a plurality of ways. In some embodiments, the processor may determine the preferred parameter based on historical data. For example, the processor may match a similar historical objective function in the historical data based on a current objective function, and designate a historical preferred parameter of the historical objective function as a preferred parameter of the current objective function.

In some embodiments of the present disclosure, by solving the objective function with the steepest descent algorithm with the preferred parameter, a solution of the objective function can be obtained more accurately, thereby improving the accuracy of imaging of the dispersion energy spectrum of surface waves.

In some embodiments, the processor may determine the preferred parameter by processing the surface wave data based on a parameter determination model. Further descriptions regarding the parameter determination model may be found in FIG. 2 and related descriptions thereof.

In some embodiments, during a process for using the second algorithm to solve the objective function, the processor may adjust the iteration step size in each round of iteration in different solving stages.

In different solving stages, the processor may adjust the iteration step size of the each round of iteration in various ways.

In some embodiments, the processor may determine an adjusted iteration step size of the current round of iteration based on a current count of processed rounds of iteration and a gradient direction consistency.

The current count of processed rounds of iteration refers to a count of rounds of iteration that have been processed before the current round of iteration.

The gradient direction consistency refers to a consistency of a gradient direction of a successive preset count of historical rounds of iteration. The higher the gradient direction consistency, the higher the consistency of the gradient direction of the successive preset count of historical rounds of iteration. The historical round of iteration is a round of iteration before the current round of iteration. The preset count may be determined by prior knowledge or historical data.

In some embodiments, the gradient direction consistency may be determined based on a statistical value of a gradient direction of the successive preset count of historical rounds of iteration. In some embodiments, the gradient direction consistency may be determined based on a variance of the gradient direction of the successive preset count of historical rounds of iteration. For example, the gradient direction of the successive preset count of historical rounds of iteration may be quantized (e.g., quantized into an angle-related value) and the variance may be determined, and a reciprocal of the variance may be determined as the gradient direction consistency.

The processor may determine the adjusted iteration step size in a plurality of ways. In some embodiments, the adjusted iteration step size of the current round of iteration may be negatively related to the current count of processed rounds of iteration. For example, the smaller the current count of processed rounds of iteration, the larger the adjusted iteration step size. In some embodiments, the adjusted iteration step size of the current round of iteration may be positively related to the gradient direction consistency. For example, the higher the gradient direction consistency, the larger the adjusted iteration step size.

In some embodiments of the present disclosure, the iteration step size may be adjusted according to the current count of processed rounds of iteration and a gradient direction consistency of each of latest successive rounds of iteration, which can improve an accuracy of a solution.

In some embodiments, the processor may determine a sampling interval based on the current count of processed rounds of iteration and gradient direction consistency; and determine the adjusted iteration step size of the current round of iteration based on the sampling interval.

The sampling interval is taken from a preset probability distribution. For example, the sampling interval may be a part of a preset probability distribution with a certain interval length. The interval length may be preset manually or by a system.

The preset probability distribution refers to a distribution used to describe a probability rule of the iteration step size. An abscissa axis of the preset probability distribution corresponds to the iteration step size, and an ordinate axis corresponds to a probability density.

In some embodiments, the preset probability distribution may be a normal distribution. A parameter of the preset probability distribution corresponds to a parameter of the normal distribution, that is, the parameter of the preset probability distribution includes a mean and a variance.

The processor may determine the sampling interval in the preset probability distribution. In some embodiments, the processor may determine the sampling interval through a preset rule based on the current count of processed rounds of iteration and the gradient direction consistency. In some embodiments, the preset rule may be that the smaller the current count of processed rounds of iteration, the higher the gradient direction consistency, and the closer to the right the sampling interval is on the abscissa axis of the preset probability distribution.

In some embodiments, the processor may determine a parameter of the preset probability distribution based on a preferred parameter output by the parameter determination model. In some embodiments, the processor may designate a preferred iteration step size output by the parameter determination model as the mean of the preset probability distribution.

In some embodiments, the processor may determine the preferred count of rounds of iteration output based on the parameter determination model to determine the variance of the preset probability distribution. For example, the processor may determine that the variance of the preset probability distribution is greater when the preferred count of rounds of iteration output by the parameter determination model is greater.

In some embodiments, the processor may determine the variance of the preset probability distribution by table look-up based on the preferred count of rounds of iteration and a preset table. In some embodiments, the preset table includes corresponding relationships between different preferred counts of rounds of iteration and variances of different preset probability distributions and may be predetermined based on prior knowledge or historical data.

In some embodiments, the processor may randomly take on values within the sampling interval to determine the adjusted iteration step size of the current round of iteration. In some embodiments, the processor may use a probability density corresponding to the preset probability distribution to take on the values within the sampling interval to determine the adjusted iteration step size of the current round of iteration.

In some embodiments of the present disclosure, by sampling based on a preset probability distribution determined by an optimal parameter, a potential optimal solution space may be better covered, and search efficiency of the algorithm may be improved. At the same time, it can effectively avoid falling into a local optimal solution and ensure the search efficiency by dynamically adjusting the sampling interval to determine the iteration step size according to the current round of iteration and the gradient direction consistency, thereby improving search accuracy of the algorithm. Therefore, from a macro-statistical point of view, a plurality of iteration step sizes of a plurality rounds of iterations are distributed around the preferred iteration step size determined by the parameter determination model.

It should be noted that the above descriptions of the process are only for illustration and description, and do not limit the scope of application of the present disclosure. For those skilled in the art, various modifications and changes may be made to the process under the guidance of the present disclosure. However, such modifications and changes are still within the scope of the present disclosure.

Figure 2:
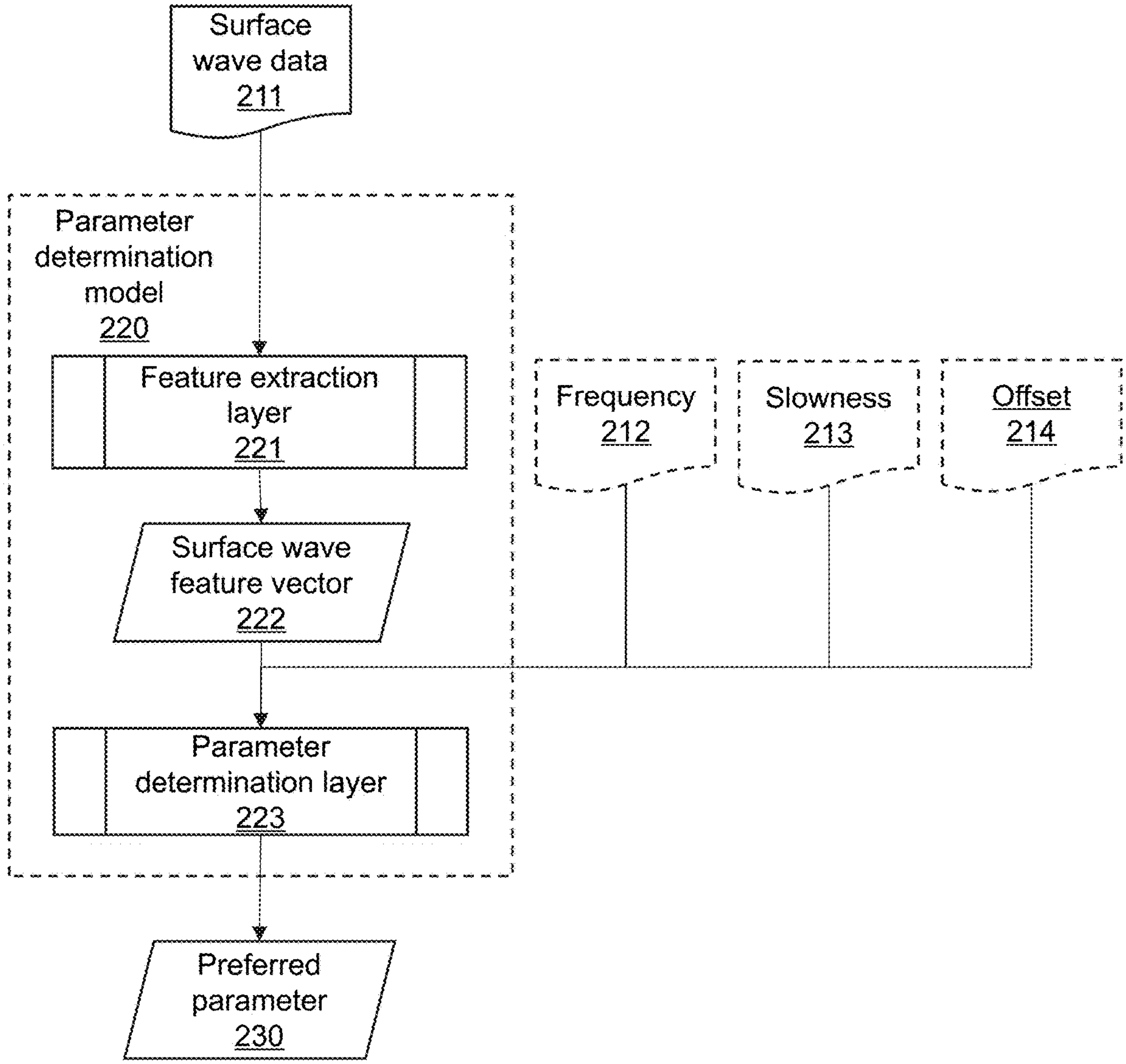
FIG. 2 is an exemplary schematic diagram illustrating a parameter determination model according to some embodiments of the present disclosure.

FIG. 2 is an exemplary schematic diagram illustrating a parameter determination model according to some embodiments of the present disclosure.

In some embodiments, the processor may determine a preferred parameter 230 by processing surface wave data 211 based on a parameter determination model 220; the parameter determination model 220 is a machine learning model.

In some embodiments, the parameter determination model 220 may be a machine learning model with a custom structure hereinafter. The parameter determination model 220 may also be a machine learning model of other structures, such as a neural network model, etc.

In some embodiments, the parameter determination model 220 may include a feature extraction layer 221 and a parameter determination layer 223. In some embodiments, the feature extraction layer 221 and the parameter determination layer 223 may be deep neural networks (DNN).

In some embodiments, an input of the feature extraction layer 221 may be the surface wave data 211, and an output of the feature extraction layer 221 may be a surface wave feature vector 222. The output of the feature extraction layer 221 may be designated as an input of the parameter determination layer 223. In some embodiments, the input of the parameter determination layer 223 may be the surface wave feature vector 222, and an output of the parameter determination layer 223 may be the preferred parameter 230. The surface wave data 211 may be at least one of first surface wave data, second surface wave data, and third surface wave data.

In some embodiments, an input of the parameter determination model 220 includes a frequency 212, slowness 213, and an offset 214. In some embodiments, the frequency 212, the slowness 213, and the offset 214 may be input into parameter determination layer 223 together with the surface wave feature vector 222 to determine the preferred parameter 230. Relevant descriptions regarding the frequency, the slowness, and the offset may be found in related descriptions hereinabove.

In some embodiments of the present disclosure, the input of the parameter determination model includes the frequency, the slowness, and the offset, which may further optimize a calculation of an optimal parameter, thereby improving accuracy of calculating a solution of the parameter determination model.

In some embodiments, the parameter determination model 220 may be trained based on labeled training samples. The training sample includes sample surface wave data, which may be obtained by analyzing historical surface wave data. The label is an optimized parameter for each set of the historical surface wave data, which may be obtained through annotation by a processor. When determining the label, the processor may use a plurality sets of different optimized parameters to perform experiments and select an optimized parameter with the best experimental effect as the label. A situation with the best experimental effect includes: an evaluation score of an execution time, an evaluation score of an output result, or a weighted result of the evaluation score of the execution time and the evaluation score of the output result meeting a corresponding threshold condition. The evaluation score of the execution time is negatively related to the execution time. The evaluation score of the output result is positively related to the output quality of the dispersion energy spectrum. Weights may be determined based on prior knowledge and historical data. The threshold condition may be preset manually or preset by a system.

In some embodiments of the present disclosure, the parameter determination model is configured to process the surface wave data, and a self-learning ability of a machine learning model may be used to extract a rule from surface wave data and obtain a correlation between the optimal parameter and the surface wave data, which improves accuracy and efficiency of determining the optimal parameter, thereby improving an imaging resolution and imaging accuracy of a dispersion energy spectrum of surface waves.

Figure 3:
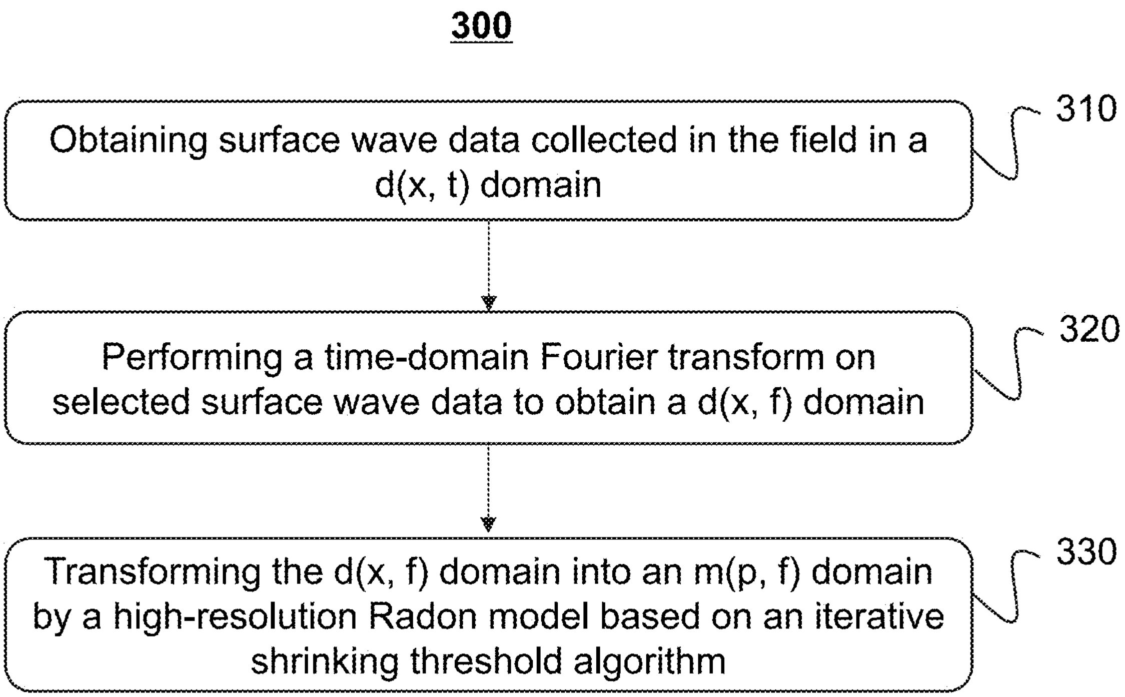
FIG. 3 is an exemplary flowchart illustrating an imaging method for a dispersion energy spectrum of surface waves according to some embodiments of the present disclosure.

FIG. 3 is an exemplary flowchart illustrating an imaging method for a dispersion energy spectrum of surface waves according to some embodiments of the present disclosure. In some embodiments, process 300 may be executed by a processor. As shown in FIG. 3, the process includes the following steps.

Step 310, obtaining surface wave data collected in the field in a d(x, t) domain.

In the d(x, t) domain, t denotes a time, that is, the surface wave data in a space-time domain may be obtained in step 310.

In some embodiments, the processor may perform preprocessing on obtained surface wave data, and the preprocessing includes selection processing and filtering processing.

Step 320, performing a time-domain Fourier transform on selected surface wave data to obtain a d(x, f) domain.

In the d(x, f) domain, f denotes a frequency, that is, the surface wave data is transformed from the space-time domain representation into a frequency-space domain representation in step 320.

Step 330, transforming the d(x, f) domain into an m(p, f) domain (i.e., a slowness-frequency domain) by a high-resolution Radon model based on an iterative shrinkage threshold algorithm, wherein a relationship between the slowness (p) and velocity (v) is defined as v=1/p, so as to construct a high-resolution dispersion energy spectrum f-v and obtain a high-resolution imaging result.

In a process of transforming the d(x, f) domain into the m(p, f) domain, in order to obtain a solution of a sparse high-resolution Radon model, the processor may designate an L1 norm as a regularization term and an L2 norm as a data error term to determine a minimum objective function; and the imaging method further includes: solving the high-resolution Radon model of the d (x, f) domain, including:

Step A1: determining a minimum objective function Φ by a formula (7):

$$\Phi = \|d - Lm\|^2 + \beta\|m\|^1, \tag{7}$$

wherein d denotes seismic data; L denotes a positive transformation operator; β denotes a regularization parameter; m denotes τ–p domain data; 2 denotes the error term; and 1 denotes the regularization term.

Step A2: solving the objective function Φ using a steepest descent algorithm.

As a further optimization of the embodiment, in step A2, solving the objective function Φ using a steepest descent algorithm includes:

A201: determining a gradient direction g by a formula (8):

$$g = L^{T*} r_{i-1}, \tag{8}$$

where $L = e^{i2\pi fpx}$, f denotes a frequency, p denotes slowness, x denotes an offset, and $r_0 = d$.

A202: selecting an iteration step size k by a formula (9);

$$k = (g^* g) / ((L^* g)^* (L^* g)), \tag{9}$$

A203: updating a model $m_i$ by a formula (10):

$$m_i = T_0^* m_{i-1} + k^* g, \tag{10}$$

wherein $T_0$ denotes a shrinkage operator and $$T_0 = \left(\max|m_i| - a\frac{I - i}{I}\max|m_i|\right),$$

where a denotes a threshold, I denotes a maximum count of rounds of iteration, i denotes a current count of rounds of iteration, and $m_0=0$.

A204: determining a data residual term $r_i$ by a formula (11):

$$r_i = d - m_i. \tag{11}$$

A205: repeatedly performing an iteration: repeating step A201 to step A204 until reaching the maximum count of rounds of iteration to stop the iteration, and outputting a high-resolution solution of the model m.

As a further optimization of the embodiment, the method further includes: constructing a high-resolution image of a dispersion energy spectrum, including:

- calculating the velocity according to the slowness; wherein the relationship between the slowness (p) and the velocity (v) is defined as: v=1/p; and
- constructing the high-resolution f-v image of the dispersion energy spectrum according to the slowness and the velocity.

Figure 4:
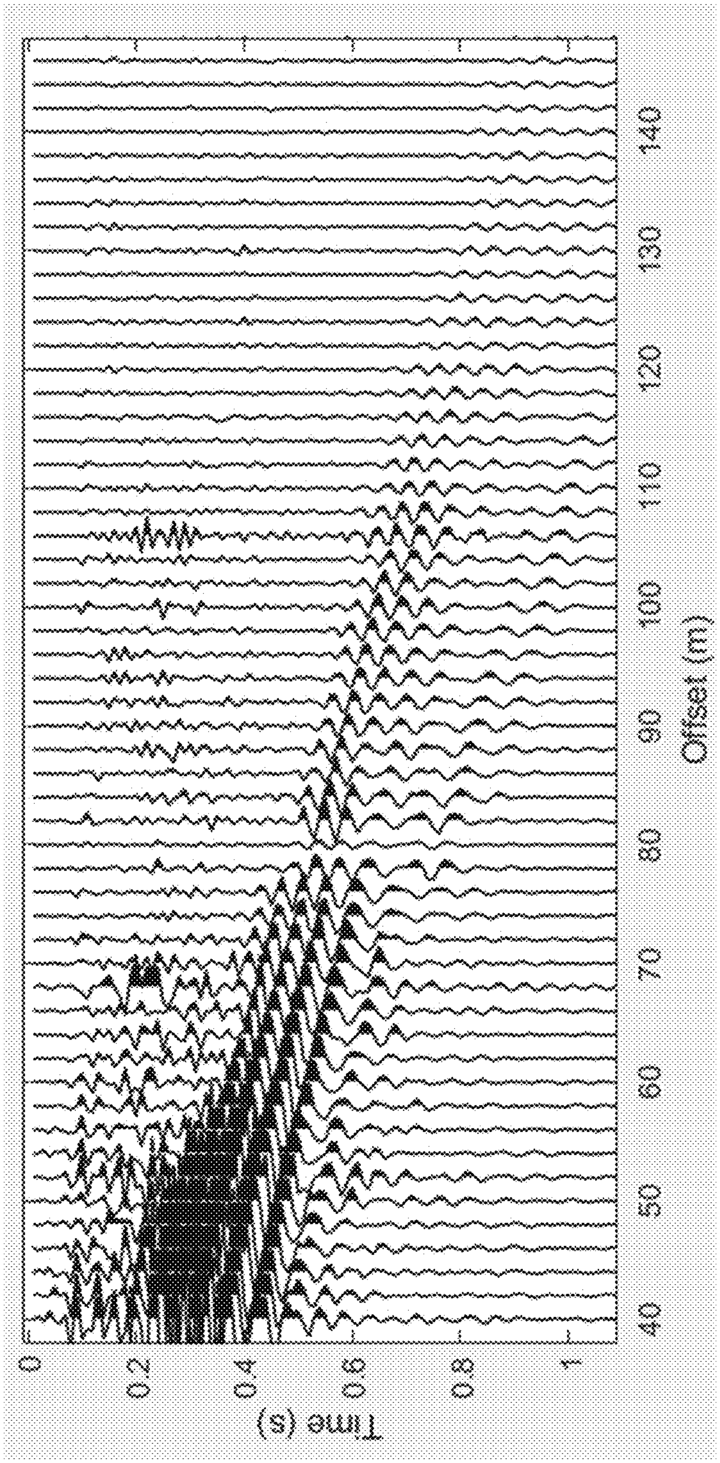
FIG. 4 is an exemplary schematic diagram illustrating an original input surface wave shot record according to some embodiments of the present disclosure.
Figure 5:
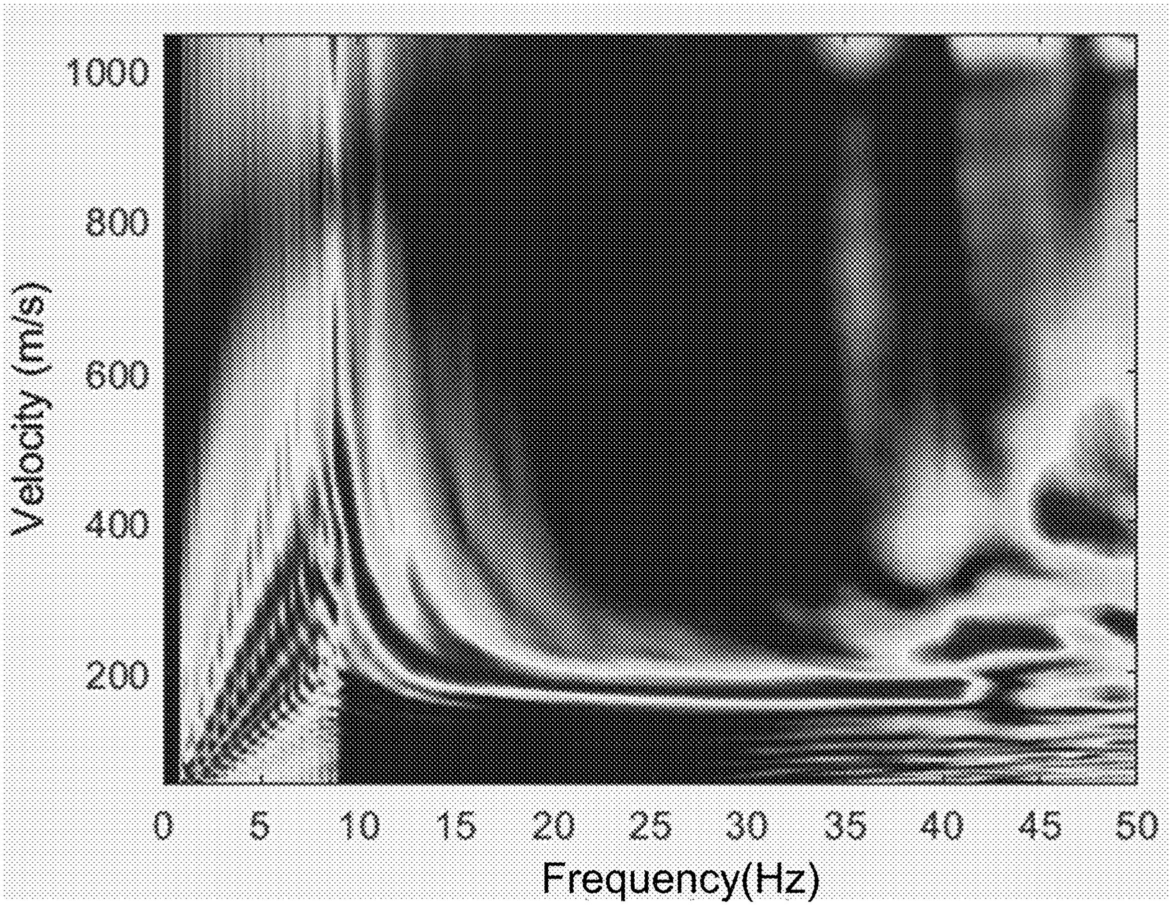
FIG. 5 is an exemplary diagram illustrating a low-resolution imaging result of the existing technology.
Figure 6:
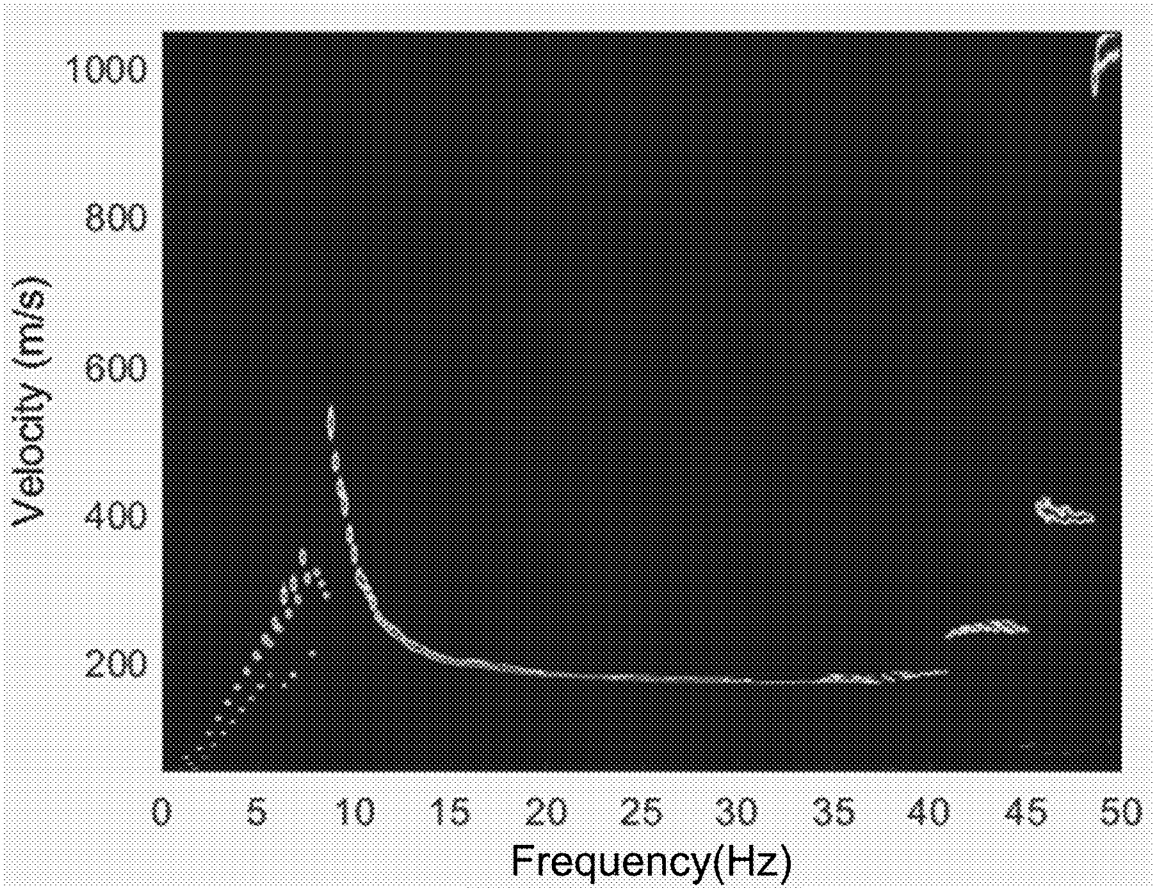
FIG. 6 is an exemplary schematic diagram illustrating a high-resolution imaging result according to some embodiments of the present disclosure.

As shown in FIGS. 4-6, FIG. 4 is an exemplary schematic diagram illustrating an original input surface wave shot record according to some embodiments of the present disclosure. FIG. 5 is an exemplary diagram illustrating a low-resolution imaging result of the existing technology. As shown in FIG. 5, a resolution of a dispersion curve is low, and it is obvious that there is more noise in a low-frequency part, which affects picking the dispersion curve. FIG. 6 is an exemplary schematic diagram illustrating a high-resolution imaging result according to some embodiments of the present disclosure. As shown in FIG. 6, noise is significantly reduced, and a dispersion curve is clear and easy to pick.

The present disclosure also provides an imaging system for a dispersion energy spectrum of surface waves of a high-resolution Radon transform based on ISTA, the imaging system is used to implement a calculation method for a dispersion energy spectrum of surface waves of a high-resolution Radon transform based on ISTA, wherein the imaging system includes:

- a data acquisition module configured to collect surface wave data of a d(x, t) domain in the field, wherein t denotes a time;
- a first transform module configured to perform a time-domain Fourier transform on surface wave data to obtain a d(x, f) domain, wherein f denotes a frequency; and
- a second transform module configured to transform the d(x, f) domain into an m(p, f) domain based on a high-resolution Radon model based on ISTA to obtain a high-resolution imaging result, wherein p denotes slowness.

The present disclosure provides the imaging method for the dispersion energy spectrum of surface waves based on the high-resolution Radon transform based on ISTA, which may achieve high-resolution imaging of a dispersion energy spectrum of surface waves, improving accuracy of picking dispersion curves, thereby ensuring accurate inversion on shear wave velocity.

The present disclosure is well applicable to surface wave data with a low signal-to-noise ratio, especially to provide reliable processing means for an increasing amount of urban surface wave data with a low signal-to-noise ratio.

Some embodiments of the present disclosure provide an electronic device, including a memory, a processor, and a computer program stored in the memory and operating on the processor. The imaging method for dispersion energy spectrum of surface waves in any one of the embodiments of the present disclosure is implemented when the processor executes the computer program.

Some embodiments of the present disclosure provide a non-transitory computer-readable storage medium where the computer program is stored. When the computer program is executed by the processor, the imaging method for dispersion energy spectrum of surface waves in any one of the embodiments of the present disclosure is realized.

Having described the basic concepts above, it is clear that the above detailed disclosures are intended only as examples for technicians skilled in the art and do not constitute the qualification of this description. Although it is not explicitly stated herein, this description may be subject to various modifications, improvements, and corrections by technicians skilled in the art. Such modifications, improvements, and corrections are suggested in the present disclosure, so such modifications, improvements, and corrections are still within the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure, or characteristic related to at least one embodiment of the present disclosure. Therefore, it is emphasized and should be appreciated that two or more references to "an embodiment" "one embodiment" or "an alternative embodiment" in various portions of the present disclosure are not necessarily all referring to the same embodiment. In addition, certain features, structures, or characteristics in one or more embodiments of the present disclosure may be properly combined.

Furthermore, unless expressly stated in the claims, the order or elements and sequences of treatment, the use of alphanumeric numbers, or other names described in this description shall not be used to define the order of processes and methods in the present disclosure. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in the present disclosure and help the understanding of one or more embodiments of the invention, in the foregoing description of the embodiments of the present disclosure, sometimes multiple features are combined into one embodiment, drawings, or descriptions thereof. This method of disclosure does not, however, imply that the subject matter of the present disclosure requires more features than are recited in the claims. Rather, claimed subject matter may lie in less than all features of a single foregoing disclosed embodiment.

In some embodiments, the numbers expressing quantities, properties, and so forth, used to describe and claim certain embodiments of the present disclosure are to be understood as being modified in some instances by the term "about,"

"approximate," or "substantially." Unless otherwise stated, "about", "approximate" or "generally" indicates that the number allows a change of ±20%. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Although the numerical ranges and parameters used in some embodiments of the present disclosure to confirm the breadth of the range are approximations, in specific embodiments, such numerical values are set as precisely as practicable.

Each patent, patent application, patent application publication, and other material, such as article, book, disclosure, publication, document, etc., cited in the present disclosure is hereby incorporated by reference in its entirety. Historical application documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of the present disclosure and the contents of the present disclosure, the descriptions, definitions, and/or terms used in the present disclosure shall prevail.

Finally, it should be understood that the embodiments described in the present disclosure are intended only to illustrate the principles of the embodiments of this description. Other modifications are also possible within the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. An imaging method for a dispersion energy spectrum of surface waves, wherein the method is executed by a processor and comprises:

obtaining first surface wave data, and the first surface wave data corresponding to a space-time domain representation;

processing the first surface wave data to obtain second surface wave data, and the second surface wave data corresponding to a space-frequency domain representation; and processing the second surface wave data based on a preset algorithm to obtain a first imaging result, the first imaging result referring to an image of the second surface wave data in a slowness-frequency domain;

processing the first imaging result based on a preset transformation algorithm to obtain a second imaging result, the second imaging result including a high-resolution dispersion energy spectrum, the preset transformation algorithm including transforming the first imaging result based on a correlation between slowness and velocity to obtain the second imaging result;

wherein the processing the second surface wave data based on a preset algorithm to obtain a first imaging result includes:

constructing an objective function based on the second wave data;

solving the objective function using a preset solving algorithm, including:

determining a preferred parameter by processing at least one of the first surface wave data, the second surface wave data, and a third surface wave data based on a parameter determination model; wherein the preferred parameter includes a preferred iteration step size, the parameter determination model is a machine learning model, the parameter determination model is trained based on labeled training sample, the training sample includes sample surface wave data, and the label is an optimized parameter for each set of the historical surface wave data;

determining a gradient direction of the objective function by a following formula:

$$g_i=L^T*r_{i-1}$$

wherein $g_i$ denotes a gradient direction of an i-th round of iteration, $L=e^{i2\pi fpx}$, f denotes a frequency, p denotes slowness, x denotes an offset, $r_n=d$, $r_{i-1}$ denotes a data residual term of an (i−1)-th round of iteration, and i denotes a current count of rounds of iteration; and updating a Radon model through at least one round of iteration based on the gradient direction and the preferred iteration step size, stopping the at least one round of iteration until an iteration end condition is met, and obtaining an optimal solution of the objective function;

wherein a solution of the objective function is the first imaging result, and the preset solving algorithm is a steepest descent algorithm.

2. The imaging method according to claim 1, wherein the processing the first surface wave data to obtain second surface wave data includes:

performing a Fourier transform on the first surface wave data to obtain the second surface wave data.

3. The imaging method according to claim 1, wherein the preset algorithm includes a high-resolution Radon transform based on an iterative shrinkage threshold algorithm.

4. The imaging method according to claim 1, wherein the preset transformation algorithm includes:

obtaining the second imaging result by transforming the first imaging result based on a correlation between slowness and velocity.

5. The imaging method according to claim 1, wherein the objective function is constructed by a following formula:

$$\Phi=\|d-L\times m\|^2+\beta\|m\|^1$$

wherein d denotes the second surface wave data; L denotes a positive transformation operator; β denotes a regularization parameter; and m denotes the Radon model.

6. The imaging method according to claim 1, wherein the at least one round of iteration is performed at least based on an iterative shrinkage threshold algorithm.

7. The imaging method according to claim 1, wherein the iteration step size is determined by a following formula:

$$k_i=(g_i\times g_i)/(L\times g_i)\times(L\times g_i)$$

wherein $k_i$ denotes an iteration step size of the i-th round of iteration.

8. The imaging method according to claim 7, wherein the updating a Radon model through at least one round of iteration is executed by a following formula:

$$m_i = T_{0_i} \times m_{i-1} + k_i \times g_i$$

wherein $T_{0_i}$ denotes a shrinkage operator of the i-th round of iteration; and $$T_{0_i} = \left( \max |m_i| - a \frac{I - i}{I} \max |m_i| \right)$$

wherein a denotes a preset threshold, I denotes a maximum count of rounds of iteration, and $m_0=0$.

9. The imaging method according to claim 1, wherein the preferred parameter further includes at least one of a preferred iteration step size and a preferred count of rounds of iteration.

10. The imaging method according to claim 1, wherein an input of the parameter determination model further includes a frequency, slowness, and an offset.

11. The imaging method according to claim 1, wherein the solving the objective function using a preset solving algorithm includes: adjusting an iteration step size in each round of iteration in different solving stages, including:

determining an adjusted iteration step size of a current round of iteration based on a current count of processed rounds of iteration and a gradient direction consistency.

12. The imaging method according to claim 1, further comprising:

performing preprocessing on the first surface wave data before performing transformation processing on the first surface wave data, wherein the preprocessing includes selection processing and filtering processing.

13. An electronic device, including a memory, a processor, and a computer program stored in the memory and operating on the processor, wherein the imaging method for dispersion energy spectrum of surface waves according to claim 1 is implemented when the processor executes the computer program.

14. A non-transitory computer-readable storage medium, wherein the storage medium stores computer instructions, and a computer executes the imaging method for dispersion energy spectrum of surface waves according to claim 1 after reading the computer instructions in the storage medium.

15. The imaging method according to claim 1, wherein the parameter determination model includes a feature extraction layer and a parameter determination layer, an input of the feature extraction layer is surface wave data, and an output of the feature extraction layer is a surface wave feature vector; wherein the surface wave data includes at least one of the first surface wave data, the second surface wave data, and the third surface wave data; and an input of the parameter determination layer is the surface wave feature vector, and an output of the parameter determination layer is the preferred parameter.

16. The imaging method according to claim 15, wherein the input of the parameter determination layer further includes a frequency, slowness, and an offset.

17. The imaging method according to claim 11, wherein the adjusting an iteration step size in each round of iteration in different solving stages further includes:

determining a sampling interval based on the current count of processed rounds of iteration and gradient direction consistency; and determining the adjusted iteration step size of the current round of iteration based on the sampling interval.

* * * * *